United States Patent
Chou

Patent Number: 6,155,867
Date of Patent: Dec. 5, 2000

[54] CABLE MOUNTING ARRANGEMENT FOR A POWER SUPPLY DEVICE

[76] Inventor: Tsai Li Hui Chou, 3F., No. 11 Ming Shiao Rd. San Ming Chu, Kao Hsiung City, Taiwan

[21] Appl. No.: 09/137,301

[22] Filed: Aug. 21, 1998

[51] Int. Cl.⁷ .................................................. H01R 9/24
[52] U.S. Cl. ...................... 439/462; 439/449; 439/926; 439/320
[58] Field of Search .................... 439/461, 462, 439/805, 807, 723, 724, 926, 320; 361/395, 386

[56] References Cited

U.S. PATENT DOCUMENTS

| | | |
|---|---|---|
| 2,655,638 | 10/1953 | Allen .................................. 439/461 |
| 3,904,812 | 9/1975 | Daffron ............................... 439/462 |
| 5,057,971 | 10/1991 | Hautvast et al. ..................... 439/462 |
| 5,362,253 | 11/1994 | Lin et al. ............................ 439/462 |
| 5,573,423 | 11/1996 | Lin et al. ............................ 439/462 |

*Primary Examiner*—Hien Vu
*Attorney, Agent, or Firm*—Bacon & Thomas, PLLC

[57] ABSTRACT

A cable mounting arrangement for a power supply device including a casing having a threaded through hole, a cable having a tapered electric connector inserted through the threaded through hole and connected to a terminal on a circuit board inside the casing, and a tapered jacket threaded into the threaded through hole and covered on the tapered electric connector to hold the tapered electric connector in place.

1 Claim, 3 Drawing Sheets

CABLE MOUNTING ARRANGEMENT FOR A POWER SUPPLY DEVICE

BACKGROUND OF THE INVENTION

The present invention relates to a power supply device, and more specifically to the cable mounting arrangement of a power supply device.

In a power supply device, the conductors of the cable are directly welded to the circuit board inside the casing of the device. If the specification of the cable does not fit the client's particular requirement, it must be disconnected from the circuit board for a replacement. However, because the cable is inserted through a through hole on the casing and welded to the circuit board, it is difficult to replace the cable.

SUMMARY OF THE INVENTION

It is one object of the present invention to provide a cable mounting arrangement for a power supply device which is easy to install. It is another object of the present invention to provide a cable mounting arrangement for a power supply device which allows the user to replace the cable conveniently. According to the present invention, the cable has a tapered connector at the end inserted through a threaded through hole on the casing of the power supply device and connected to a terminal at a circuit board inside the casing, and a tapered jacket threaded into the threaded through hole to hold the tapered electric connector in position.

DETAILED DESCRIPTION OF THE PREFERRED EMBODIMENT

Figure 1:
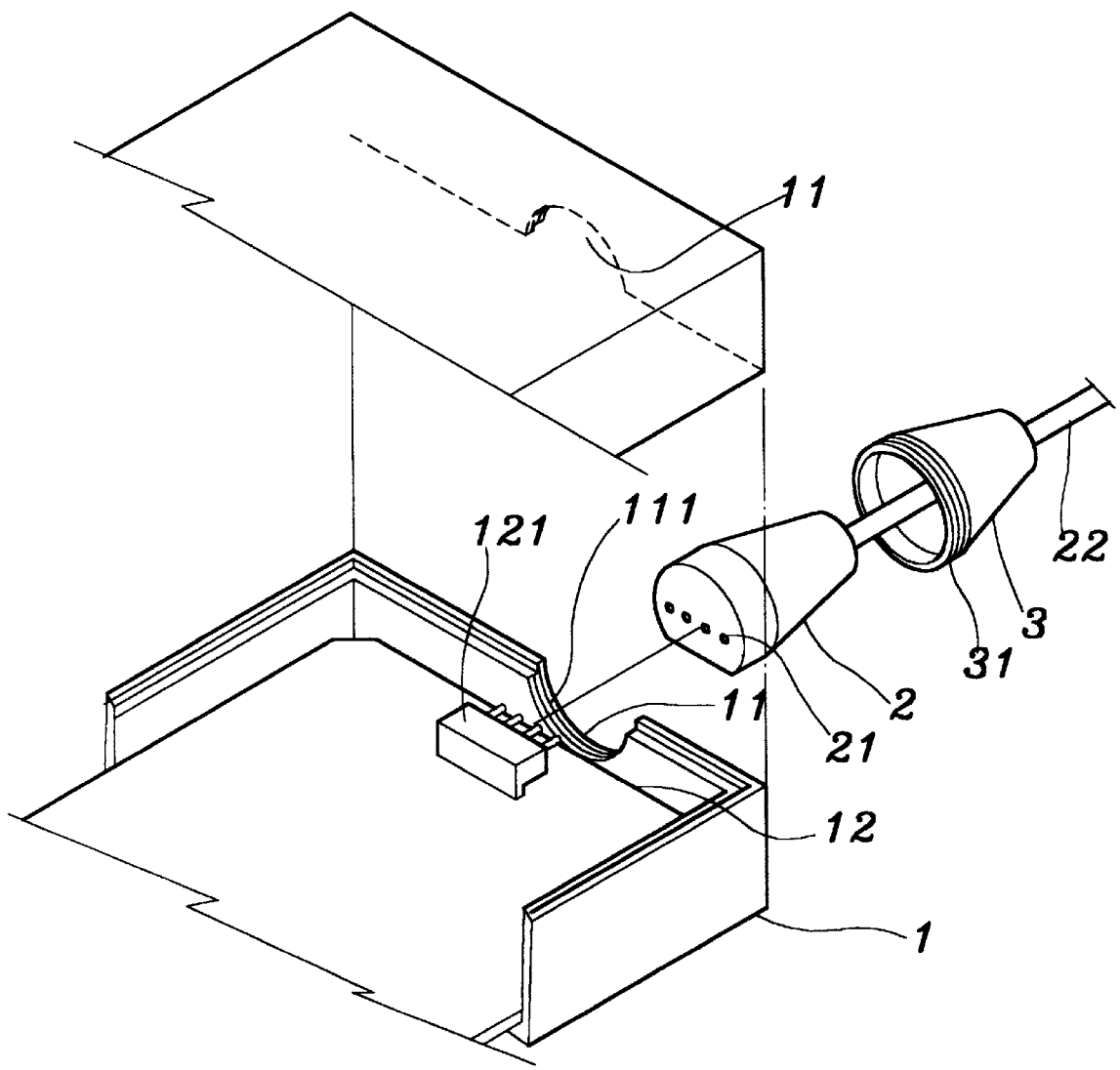
FIG. 1 is an exploded view of the present invention.

Referring to FIG. 1, the present invention comprises a casing 1 for a power supply device, an electric connector 2, and a jacket 3. The casing 1 has a through hole 11 at one upright side wall thereof, and threads 111 in the through hole 11. The electric connector 2 is a tapered member having contact holes 21 at the front side thereof for connection to a terminal 121 on a circuit board 12 inside the casing 1, and a cable 22 extended from the rear side thereof. The jacket 3 is a tapered cap molded from a flexible plastic material and mounted around the cable 22, having threads 31 at the periphery near the front side thereof for engagement with the threads 111 in the through hole 11. The inner diameter of the jacket 3 fits the outer diameter of the electric connector 2.

Figure 2A:
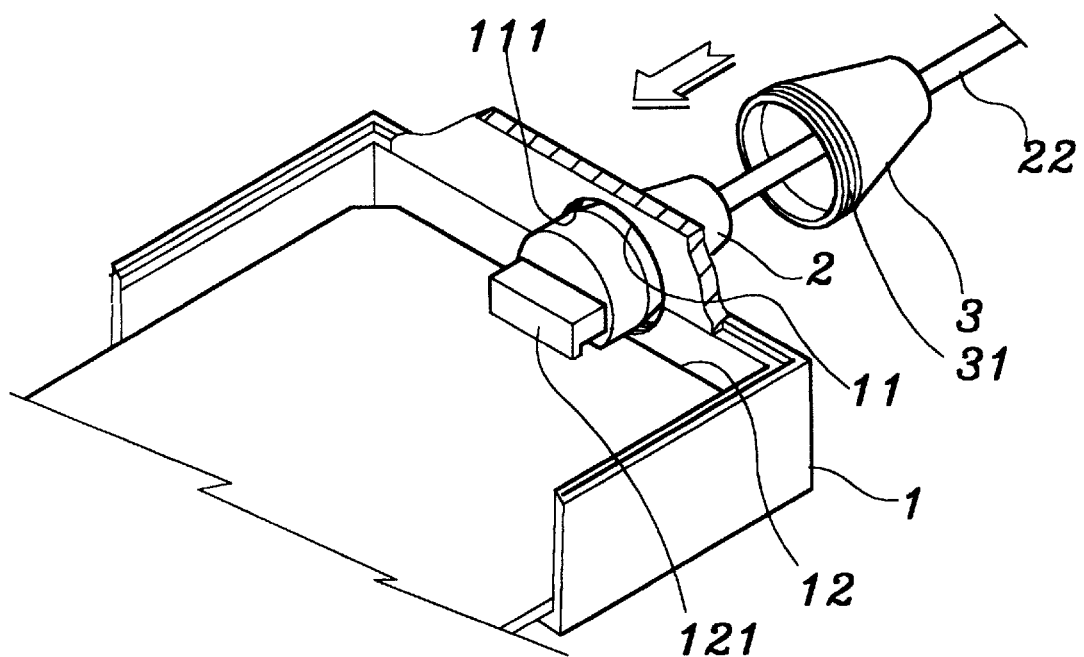
FIG. 2A is an installed view of the present invention, showing the tapered electric connector inserted through the through hole on one upright side wall of the casing and connected to the terminal at the circuit board.
Figure 2B:
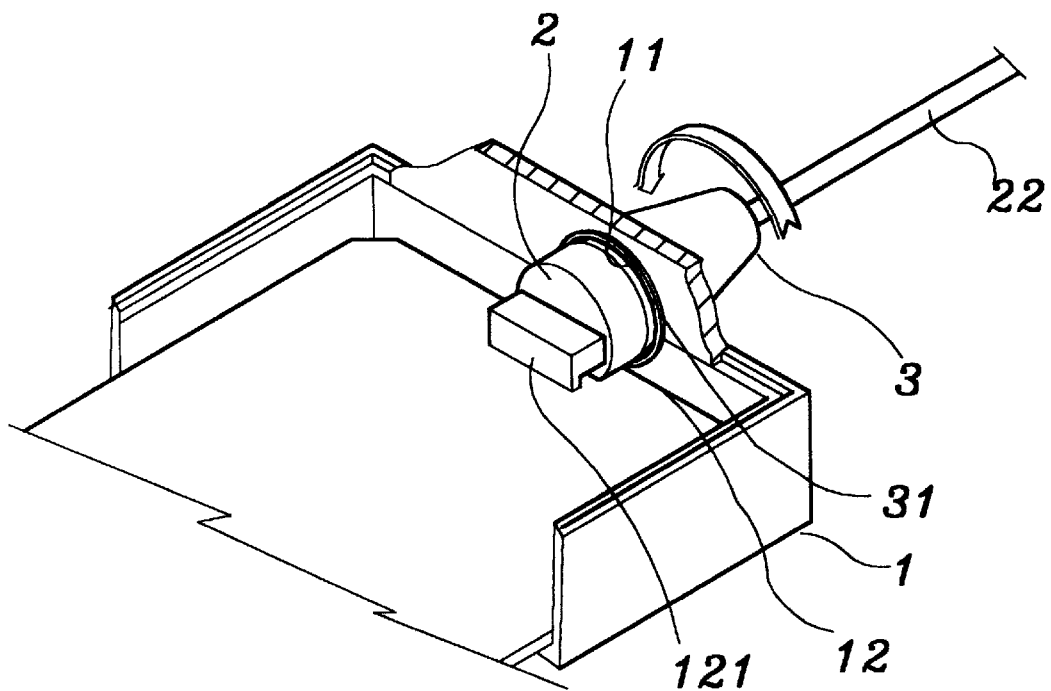
FIG. 2B is an installed view of the present invention, showing the tapered jacket threaded into the through hole and covered on the tapered electric connector.

Referring to FIGS. 2A and 2B and FIG. 1 again, the electric connector 2 is inserted into the through hole 11 at the casing 1 with the contact holes 21 fastened to the terminal 121 at the circuit board 12 (see FIG. 2A), the jacket 3 is closely attached to the electric connector 2 and then threaded into the through hole 11 to force the threads 31 thereof into engagement with the threads 111 in the through hole 11 (see FIG. 2B).

Figure 3:
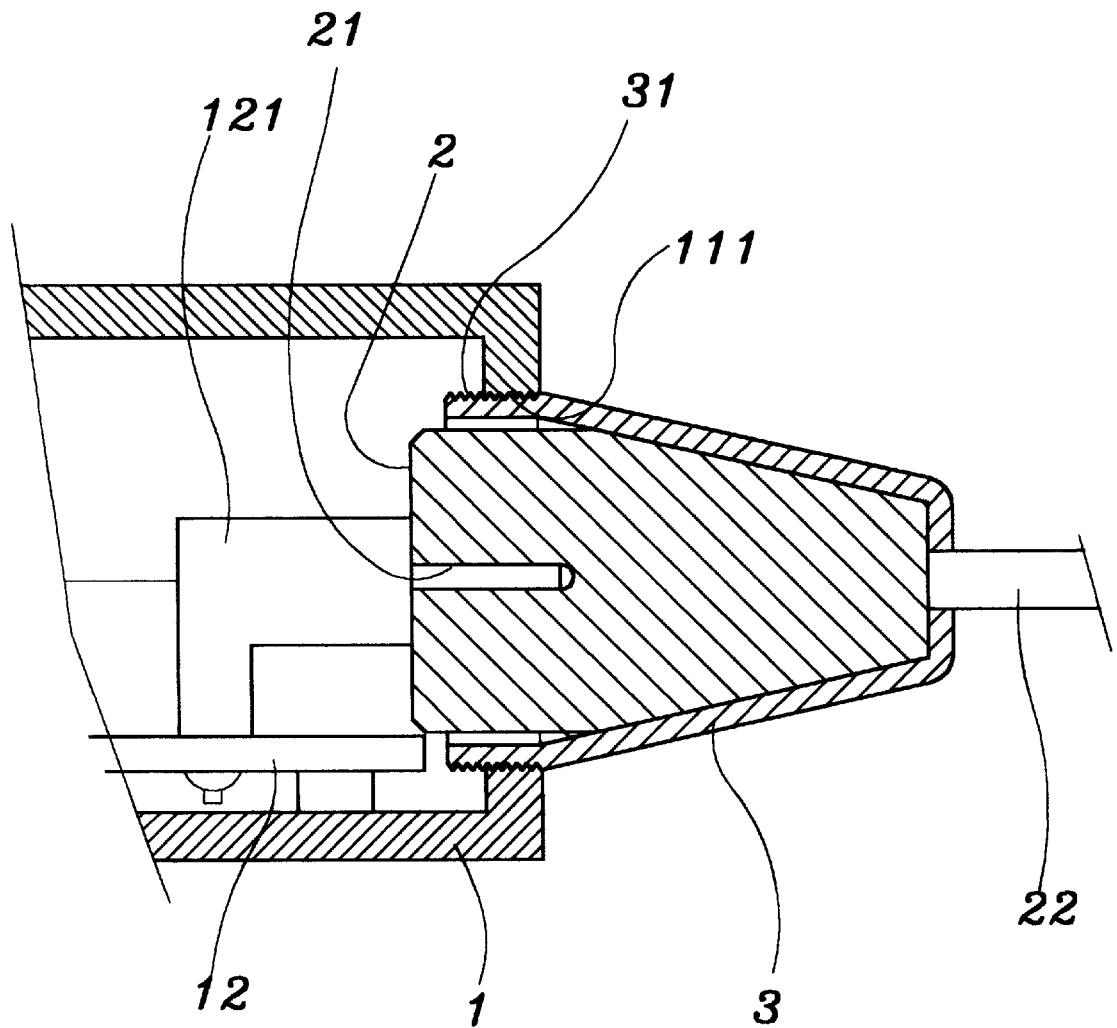
FIG. 3 is a sectional view of the present invention when installed.

Referring to FIG. 3, when the jacket 3 is threaded into the through hole 11, it is compressed against the outside wall of the electric connector 2, causing the electric connector 2 to be firmly secured in position, and therefore the connection between the electric connector 2 and the terminal 121 is ensured. When disconnecting the electric connector 2 from the terminal 121 for a replacement or repair work, the jacket 3 is rotated in the reversed direction and disengaged from the through hole 11.

While only one embodiment of the present invention has been shown and described, it will be understood that various modifications and changes could be made thereunto without departing from the spirit and scope of the invention disclosed.

What the invention claimed is:

1. A cable mounting arrangement for a power supply device, the arrangement comprising a casing having a first half portion, a second half portion and a threaded through hole formed in a wall defined by said first and second portions, a cable having a tapered electric connector, the tapered electric connector being inserted through said threaded through hole for connection to a terminal on a circuit board disposed inside said casing, and a tapered jacket molded from a flexible plastic material having a threaded portion disposed in threaded engagement with the through hole and in compression around said tapered electric connector to hold said tapered electric connector in place when the electric connector is connected to the terminal.

* * * * *